United States Patent
Hao et al.

(10) Patent No.: US 9,047,202 B1
(45) Date of Patent: Jun. 2, 2015

(54) CREATING A RELATIONSHIP TREE REPRESENTING RELATIONSHIPS OF GRAPHS TO ENABLE NAVIGATION THROUGH THE GRAPHS WITHOUT ACCESSING AN INPUT DATA SET

(75) Inventors: Ming C. Hao, Palo Alto, CA (US);
Umeshwar Dayal, Saratoga, CA (US);
Keith I. Farkas, San Carlos, CA (US);
Marie-Jo Fremont, Palo Alto, CA (US);
Mark B. Misroch, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2461 days.

(21) Appl. No.: 11/799,188

(22) Filed: Apr. 30, 2007

(51) Int. Cl.
*G06T 11/20* (2006.01)
*G06F 17/10* (2006.01)

(52) U.S. Cl.
CPC ...................... *G06F 17/10* (2013.01)

(58) Field of Classification Search
USPC ......................................................... 345/440
See application file for complete search history.

(56) References Cited

U.S. PATENT DOCUMENTS

| | | | |
|---|---|---|---|
| 5,929,863 A | 7/1999 | Tabei et al. | |
| 6,356,285 B1* | 3/2002 | Burkwald et al. | 715/853 |
| 6,377,287 B1 | 4/2002 | Hao et al. | |
| 6,489,961 B1* | 12/2002 | Baxter et al. | 345/424 |
| 6,509,898 B2* | 1/2003 | Chi et al. | 345/440 |
| 6,937,238 B2 | 8/2005 | Hao et al. | |
| 7,046,247 B2 | 5/2006 | Hao et al. | |
| 7,292,246 B2* | 11/2007 | Goldschmidt | 345/440 |
| 2003/0071815 A1 | 4/2003 | Hao et al. | |
| 2003/0208323 A1 | 11/2003 | Hao et al. | |
| 2003/0214504 A1 | 11/2003 | Hao et al. | |
| 2004/0183799 A1 | 9/2004 | Hao et al. | |
| 2004/0205450 A1 | 10/2004 | Hao et al. | |
| 2004/0252128 A1 | 12/2004 | Hao et al. | |
| 2005/0088441 A1 | 4/2005 | Hao et al. | |
| 2005/0119932 A1 | 6/2005 | Hao et al. | |
| 2005/0131927 A1* | 6/2005 | Fildebrandt et al. | 707/101 |
| 2005/0177598 A1 | 8/2005 | Hao et al. | |
| 2005/0219262 A1 | 10/2005 | Hao et al. | |
| 2006/0059439 A1 | 3/2006 | Hao et al. | |
| 2006/0095858 A1 | 5/2006 | Hao et al. | |
| 2006/0164418 A1 | 7/2006 | Hao et al. | |
| 2006/0235838 A1* | 10/2006 | Shan et al. | 707/4 |
| 2007/0022000 A1* | 1/2007 | Bodart et al. | 705/10 |

OTHER PUBLICATIONS

M. C. Hao et al., U.S. Appl. No. 11/100,429, entitled "Providing an Automated Visualization of a Collection of Data Vallues Divided Into a Number of Bins Depending Upon a Change Feature of the Data Values," filed Jan. 31, 2007, pp. 1-19, Figs. 1A-5.

(Continued)

*Primary Examiner* — M Good Johnson
(74) *Attorney, Agent, or Firm* — Trop Pruner & Hu

(57) ABSTRACT

Actions associated with visualizing an input data set using plural graphs are monitored. At least one of the graphs is produced based on selection from another of the graphs. A relationship tree that represents relationships of the graphs is created based on monitoring the actions. Output information including description data and image data is provided, where the description data contains at least a portion of the relationship tree. The output information enables interactive navigation through the plural graphs without accessing the input data set.

19 Claims, 6 Drawing Sheets
(2 of 6 Drawing Sheet(s) Filed in Color)

(56) References Cited

OTHER PUBLICATIONS

M. C. Chuah et al., "Dynamic Aggregation with Circular Visual Designs," School of Computer Science, Carnegie Mellon University, pp. 1-9 (1998).

M. Ankerst et al., "Towards an Effective Coopreation of the User and the Computer for Classification," Institute for Computer Science, University of Munich, pp. 1-10 (2000).

D A. Keim et al., "Hierarchical Pixel Bar Charts," IEEE Transactions on Visualization and Computer Graphics, vol. 8, No. 3, pp. 255-269 (Jul.-Sep. 2002).

D A. Keim et al., "Designing Pixel-Oriented Visualization Techniques: Theory and Applications," IEEE Transactions on Visualization and Computer Graphics, vol. 6, No. 1, pp. 59-78 (Jan.-Mar. 2000).

J.V. Carlis et al., "Interactive Visualization of Serial Period Data," Proceedings of UIST '98, 11th Annual Symposium on User Interface Software and Technology, pp. 1-10 (Nov. 1998).

S G. Eick et al., "Visual Scalability," Techntal Report No. 106, National Instiute of Statistical Sciences, pp. 1-27 (Jun. 2000).

G. W. Furnas, "Generalized Fisheye Views," Human Factors in Computing Systems CHI '86 Conference Proceedings, pp. 16-23 (1986).

D. Keim, "Pixel Bar Charts: A New Technique for Visualizing Large Multi-Attribute Data Sets without Aggregation," pp. 1-10 (2001).

M. C. Hao et al., "Visual Mining of E-Customer Behavior Using Pixel Bar Charts," Hewlett-Packard Research Laboratories, pp. 1-7 (2001).

D. . Keim et al., "Recursive Pattern: A Technique for Visualizing Very Large Amounts of Data," Proceedings of the 6th IEEE Visualization Conference, pp. 279-286 (1995).

A. Aris et al., "Representing Unevenly-Spaced Time Series Data for Visualization and Interactive Exploration," pp. 1-12 (2005).

M. Weber et al., "Visualizing Time-Series on Spirals," pp. 1-6 (2001).

L. Wei et al., "Assumption-Free Anomaly Detection in Time Series," University of California—Riverside, Department of Computer Science & Engineering, pp. 1-4 (2005).

R. Rao et al., http://sigchi.org/chi95/proceedings/videos/rr_bdy.htm, pp. 1-4 (at least as early as Jan. 12, 2007).

* cited by examiner

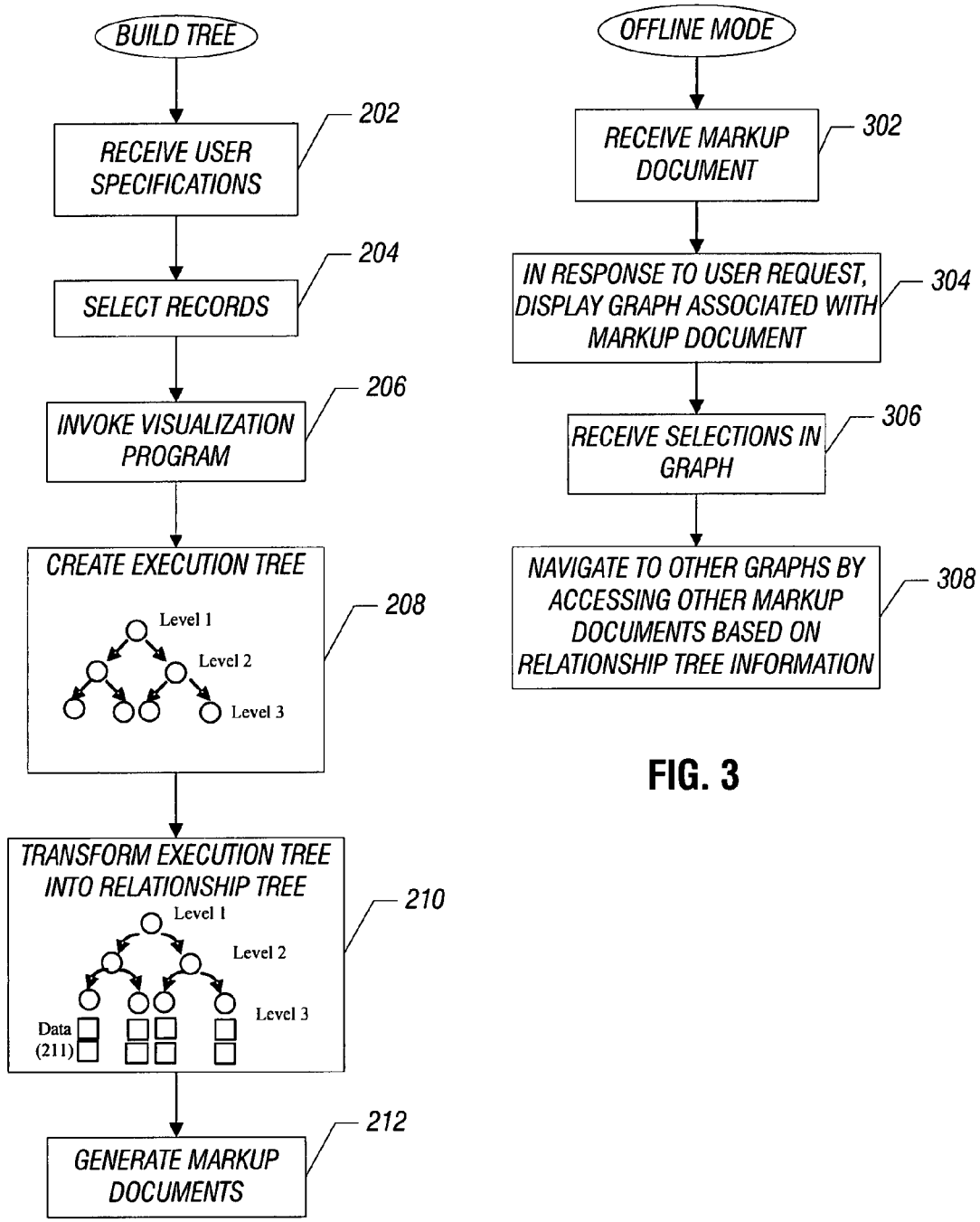

CREATING A RELATIONSHIP TREE REPRESENTING RELATIONSHIPS OF GRAPHS TO ENABLE NAVIGATION THROUGH THE GRAPHS WITHOUT ACCESSING AN INPUT DATA SET

BACKGROUND

The storage capacity of storage devices have increased dramatically to allow storage devices to store vast amounts of data. An enterprise (such as a business, government agency, or educational organization) can collect data regarding various aspects of the enterprise such that the data can be analyzed to provide feedback regarding information of interest to the enterprise (such as purchase habits of customers, customer complaint patterns, network performance, storage system performance, and so forth).

In some scenarios, a user may desire to visually analyze the collected data to better understand an aspect of the enterprise. However, an input data set can be quite large, making traditional visualization techniques impractical. Moreover, some visualization programs are associated with complex user interfaces that make it difficult for users who are not familiar with the visualization programs to use.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures:

FIG. 2 is a flow diagram of a process of creating a relationship tree representing relationships of graphs that visualize the input data set, in accordance with an embodiment;

FIG. 3 is a flow diagram of a process of operation in an offline mode using the relationship tree, in accordance with an embodiment;

DETAILED DESCRIPTION

Figure 1:
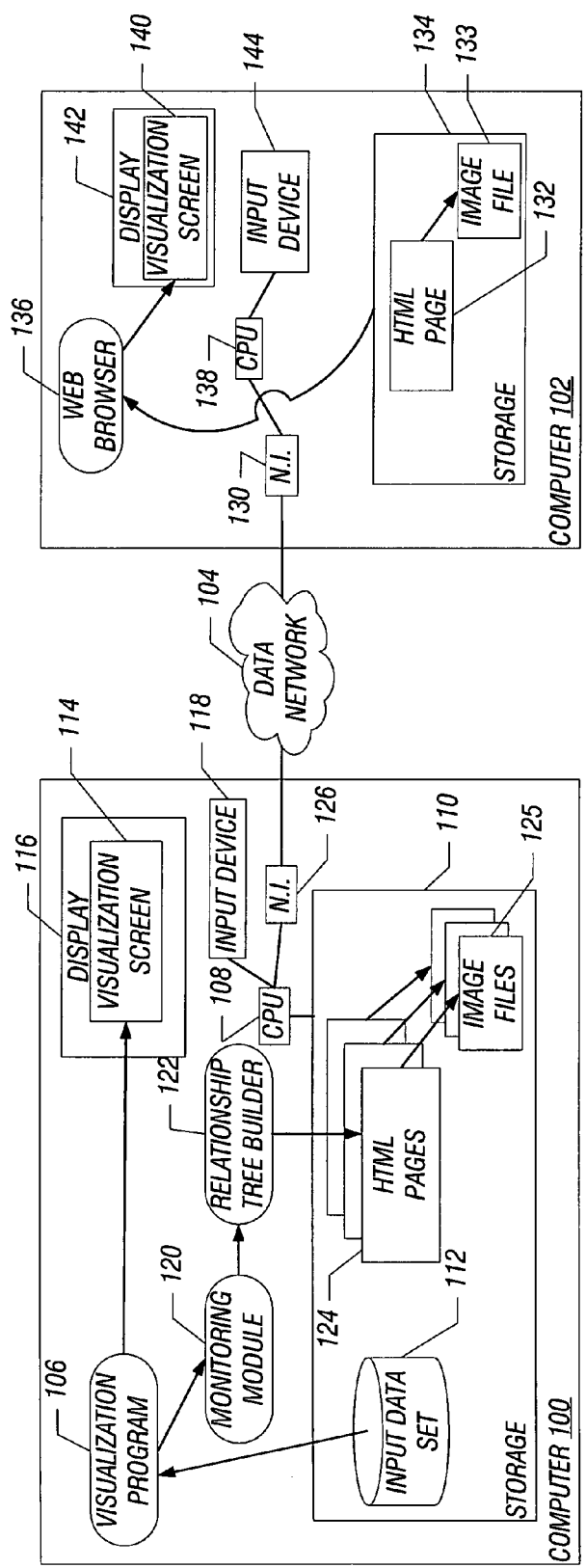
FIG. 1 is a block diagram of an arrangement to enable visualization of an input data set, in accordance with an embodiment.

In accordance with some embodiments, a technique is provided to allow for creation of a relationship tree (referred to as a "hidden-link tree") that represents a hierarchical relationship of various graphs for visualizing an input data set. Each of the graphs is used to visually present data associated with some aspect of the input data set. Generally, a "graph" refers to any visual representation of a collection of data, such as a chart (e.g., pixel bar chart, a line chart), a diagram that depicts lines, curves, points, or areas representing variation of one or more parameters with respect to a variable, a table, data fields, and so forth. The graphs are arranged at different hierarchical levels, where the graphs include a top-level graph, child graphs at a second level lower than the top level, and further child graphs at a third level lower than the second level. The graphs are visualized in a sequence based on user selections starting in the top-level graph and drilling down into lower level graphs.

Links between the graphs are provided by the relationship tree. The relationship tree is an abstract data structure that includes nodes with links interconnecting the nodes. The relationship tree is not actually a separate data structure that is stored in a system; rather, information relating to the nodes and links between the nodes are embedded in the respective graphs (hence, the relationship tree is referred to as a hidden-link tree since the relationship tree is not visible to a user). The nodes of the relationship tree represent the graphs, and the links represent how the graphs are related to each other.

In some embodiments, the relationship tree is dynamically created based on an execution order (or execution stack) of a visualization program that is used to visualize the various aspects of the input data set. This is accomplished by monitoring user selections when using the visualization program. For example, the user can specify a top-level graph to visualize some aspect of the input data set (e.g., a graph that depicts monthly sales amounts). Next, using the visualization program, a user can make selections (such as by clicking on various parts of the top-level graph or performing a rubber-banding operation using an input device such as a mouse) to drill down into various parts of the graph to obtain further information or to select other aspects of the input data set to visualize. The graphs that are displayed based on the user selections are referred to as drill-down graphs, since such graphs allow the user to drill down into further or different details regarding some aspect of the information relating to the top-level graph. Within the drill-down graphs, the user can further make selections to cause additional drill-down graphs to be displayed to visualize other aspects of the input data set. The different levels corresponding to the top-level graph and the various levels of the drill-down graphs correspond to the levels of the relationship tree. The links of the relationship tree are thus created based on the monitored actions associated with the visualization program in response to user selections. In this manner, the relationship tree is dynamically created. The dynamic creation of the relationship tree is performed with an interactive mode of the visualization program.

The visualization program is associated with user interfaces (UIs) that allow a user to visualize different aspects of the input data set. These UIs can be relatively complex since the visualization program can be a powerful program to allow for flexible visualization of an input data set. However, for users who are not familiar with the UIs of the visualization program, use of such visualization program to navigate through various graphs can be a challenge. In accordance with some embodiments, the relationship tree that is dynamically created based on monitored actions allows for the generation of output information, which can be in the form of description data and image data. An example of the description data can be markup documents, e.g., Hypertext Markup Language (HTML) pages, Extensible Markup Language (XML) pages, and so forth. The relationship tree is embedded in the description data. The image data (e.g., image files) included in the output information represent the graphs. The output information is accessible by a user to dynamically and iteratively navigate (in an interactive manner) through plural graphs associated with a relationship tree without the user having to access the visualization program or to access the input data set. By not having to access the visualization program to iteratively navigate through graphs that visualize aspects of an input data set, users who are not familiar with the visualization program can nevertheless be able to navigate through the plural graphs to allow for the users to better understand the input data set. Iteratively navigating through the graphs means that a user can repeatedly make different selections in different graphs to access other graphs. Also, since the relationship tree is dynamically created based on monitored actions during the interactive mode, a user can navigate through the graphs without pre-arrangement of the relationships of the graphs.

Moreover, the input data set can be a relatively large input data set that is stored remotely at some database server. Having to access such a large input data set can be relatively slow, particularly for users who are located at remote locations with low-bandwidth connections. Moreover, having to access the input data set to visualize the input data set places a burden on a network, particularly if there are a relatively large number of users who are accessing the input data set. The ability to navigate through graphs representing an input data set without having to access the input data set improves efficiency in visualization techniques according to some embodiments. In fact, the graphs can be accessed by a user on a system (e.g., a portable computer or a personal digital assistant) that may not be sufficiently powerful to access the original input data set for generating the desired graphs. For example, a web browser can be used to access various HTML pages representing the graphs to display the graphs. Effectively, an offline mode is provided to allow a user to navigate through graphs that visualize the input data set without having to access the input data set or to use the visualization program.

Note that an administrator or developer in some implementations can predetermine the drill-down graphs to be used and the context in which such drill-down graphs are to be used. For example, if a user selects an area of high central processing unit (CPU) utilization, the administrator can predetermine that a drill-down graph showing the number of jobs running on a system is to be used. On the other hand, if the user selects an area of low CPU utilization, then a drill-down graph showing disk utilization can be shown instead.

FIG. 1 illustrates an arrangement that includes a first computer 100 and a second computer 102 that are interconnected by a data network 104 (e.g., a local area network, a wide area network, or the Internet). The computer 100 includes a visualization program 106 that is executable on one or more CPUs 108. The CPU 108 is connected to a storage 110, where the storage 110 can be used to store an input data set 112. Using the visualization program 106, a user at the computer 100 can visualize various aspects of the input data set. The visualization program 106 is able to display graphs for visualizing the input data set 112 in one or more visualization screens 114 in a display device 116 of the computer 100. A visualization screen is a graphical user interface (GUI) screen, such as a window or part of a window defined by an operating system such as WINDOWS®, UNIX, LINUX, etc.

The visualization screen(s) 114 can be used to display various graphs generated by the visualization program 106. Examples of graphs that can be produced by the visualization program 106 include a pixel bar chart, a line chart, a visualization map, a tree map, and so forth. A pixel bar chart fills various bars with data records, where the bars correspond to different values of an x-axis category attribute, and where each bar is filled with pixels representing the y-axis measurement attribute data values. The pixels are assigned visual indicators depending on the attribute data values being represented by the pixels. In one implementation, the visual indicators are colors, where different colors are mapped to different attribute data values.

Another feature of the graphs that are displayed in the visualization screen(s) 114 by the visualization program 106 is that a user is able to select different parts of the graph to perform drill-down operations (to select further detailed data corresponding to parts of the graphs that the user wishes to further analyze). Selection of a part of the graph can be performed by clicking on an input device (e.g., a mouse) or by performing a rubber-band operation that selects a particular region of the graph (also using a mouse), for example.

In accordance with some embodiments, a monitoring module 120 is executable on the computer 100 to monitor user selections made in graphs displayed by the display device 116. Although shown as a separate software module, the monitoring module 120 can actually be part of the visualization program 106 in a different implementation. The user selections made in the visualization program 106 are monitored by the monitoring module 120 to determine what graphs are invoked based on the user selections. The selections of the user that result in invocations of graphs are recorded by the monitoring module 120. The sequence of selections is the execution order of the visualization program 106. This execution order in turn can be used by a relationship tree builder 122 (which can be separate from or part of the visualization program 106) to build a relationship tree having multiple nodes and links between nodes, where the nodes represent respective graphs, and links between nodes indicate relationships between the graphs. The links are derived based on the execution order of the visualization program 106. For example, a user may have started with a top-level graph and progressively made selections to drill down deeper starting from the top-level graph into lower level graphs to view different aspects of the input data set 112. Thus, in this example, there would be a first link from the top-level graph to a first child graph, and another link from the first child graph to a lower-level second child graph (based on selection of a part of the first child graph that caused drill down to be performed into a second child graph).

As noted above, the relationship tree built by the relationship tree builder 122 is actually not a separate data structure, according to some embodiments. Rather, the relationship tree is embedded into the respective graphs by embedding link information into representations of the graphs. In one embodiment, HTML pages 124 are created to represent respective graphs. The link information of the relationship tree corresponding to the graphs is embedded into the HTML pages 124 so that a subsequent user can access the HTML pages 124 in an offline mode for the purpose of iteratively navigating through the various graphs represented by the relationship tree without having to access the input data set 112 and without having to use the visualization program 106.

In some implementations, visual indicators can be included in the graphs of links in cases where it is not readily apparent what part of a graph is linked to child graphs. The visual indicator can be a dot or other display element having a predefined color or having one of several colors to reflect different attributes. Even if visual indicators of links are not provided in the graphs, it is noted that users can learn where the hot spots are in the graph in which the users can link to other graphs.

The HTML pages 124 further include document links (e.g., hyperlinks) to image files 125 (e.g., JPEG images or other images) that contain images of respective graphs. During offline mode, these image files 125 are accessed to display the graphs, so that the input data set 112 does not have to be accessed. In fact, the display of the images of the image files 125 can be accomplished using a simple interface such as a web browser, which most users are familiar with. In other implementations, the images of the graphs can be embedded in the HTML pages.

The building of a tree based on monitored selections of a user, as discussed above, is performed during an interactive mode using the visualization program 106. Some embodiments of the invention also provide an offline mode, where access of the visualization program 106 and the input data set 112 is not performed to navigate through graphs that visualize the input data set 112. To accomplish this, an HTML page 124 can be sent from the first computer 100 through a network interface 126 and over the data network 114 to the second computer 102. The HTML page 124 that is sent to the second computer 102 can be the HTML page for the top-level graph (or some other graph) represented by a relationship tree. The HTML page transmitted from the first computer 100 to the second computer 102 is received through a network interface 130 of the second computer 102 and stored as HTML page 132 in a storage 134 of the computer 102. The corresponding image file 125 is also sent from the first computer 100 to the second computer 102 and stored in the second computer 102 as image file 133. In an alternative implementation, instead of just sending the HTML page of the top-level graph, additional HTML pages of other graphs can also be transmitted over the data network 104 to the second computer 102. However, communicating the additional HTML pages is not necessary since the computer 102 can retrieve the additional HTML pages 124 stored in the storage 110 of the first computer 100 when a user at the second computer 102 selects links in the HTML page 132 that cause access of additional information. In one example, a web server can be run on computer 100 to facilitate the transfer of HTML pages.

The computer 102 includes a web browser 136 that is executable on one or more CPUs 138, which is connected to the storage 134. The web browser 136 can access the HTML page 132 in the second computer 102 to display the graph represented by the HTML page 132. The graph can be displayed by the web browser 136 in a visualization screen 140 of a display device 142 in the computer 102. In response to user selection made with an input device 144, such as a click or a rubber-band operation on a part of the displayed graph, the web browser 136 can access additional HTML pages (which can either be stored in the storage 134 of the second computer 102, or in the storage 110 of the first computer 100) to display the drill-down graphs. Note that the graphs can be represented as image files.

As depicted in FIG. 1, a user at the second computer 102 can navigate through graphs that visualize the input data set 112 without having to access the input data set 112 and without having to use the visualization program 106 in the computer 100. This provides great flexibility in that many users can navigate through graphs that visualize the input data set in the offline mode without placing a burden on the data network 104 or on the computer 100. Note that the HTML pages 124 and associated image files 125 can be sent to many different computers to allow users at the different computers to perform visualizations in offline mode.

The discussion above assumes that the visualization program 106 has created one relationship tree corresponding to a first set of graphs that visualize the input data set 112. Note that the visualization program 106 can be used to create additional relationship trees to represent other sets of graphs for visualizing other aspects of the input data set 112, such as visualizing different attributes. Moreover, multiple relationship trees can be embedded in a single set of graphs if, for example, the links are explicitly shown with visual indicators (e.g., colored circles, with each color representing a corresponding embedded tree). Alternatively, pop-up indicators can be used to indicate which links belong to which relationship trees. In this way, visual indicators are provided in at least some of the graphs so that a user can determine which links correspond to which of the embedded relationship trees.

FIG. 2 is a flow diagram of a process (performed by the computer 100, for example) of building a relationship tree according to an embodiment. Initially, the visualization program 106 receives (at 202) user specifications regarding aspects of the input data set to visualize. As examples, the user specifications can include attributes to visualize, aggregations to be performed on attribute data values (where the aggregation can include an average, maximum, minimum, three-sigma analysis, etc.), data levels, and so forth. Based on the received user specifications, the visualization program selects (at 204) records from the input data set that are to be used for visualization.

Next, the visualization program 106 is invoked (at 206). The visualization program 106 presents visualization screens that display graphs (e.g., pixel bar charts, line charts, visualization maps, and tree maps) of the selected data records. A user can make selections in the visualization screens (such as by clicking or rubber-banding selections) to drill down to lower level graphs. Based on monitoring by the monitoring module 120, an execution tree that represents the execution order (or execution stack) of the visualization program 206 is created (at 208). The execution tree has a number of levels that correspond to the depth of drill-downs selected by a user, and the order in which the drill-downs were performed. The execution tree is transformed (at 210) into a relationship tree (or a hidden-link tree), where the relationship tree has nodes representing corresponding graphs and links representing relationships among the graphs. Also, the relationship tree is associated with data values 211 of the attribute that is being visualized. In various examples depicted in the figures, each node is shown to have two child nodes. It is noted that a node of a relationship tree can have different numbers of child nodes.

The visualization program 106 next generates (at 212) HTML pages, or other types of description data, to represent the corresponding graphs. The information associated with the relationship tree is embedded in the HTML pages.

FIG. 3 shows a process (performed by the computer 102, for example) of an offline mode that allows a user to navigate through graphs that visualize an input data set without having to access the input data set or to access the visualization program 106. In the offline mode, an HTML page is received (at 302), such as an HTML page that represents the top-level graph. Note that the received HTML page can also represent a lower level graph.

In response to user selection, the graph represented by the received HTML page is displayed (at 304). The user selection can be some selection (e.g., double-clicking) to open the HTML page, which causes the web browser 116 to be launched to display the graph.

Selections made in the graph, such as user clicks or rubber-banding operations, are received (at 306), which then causes the computer to navigate (at 308) to other graphs (drill-down graphs) by accessing other HTML pages based on the relationship tree information that is embedded in the HTML pages.

Figure 4:
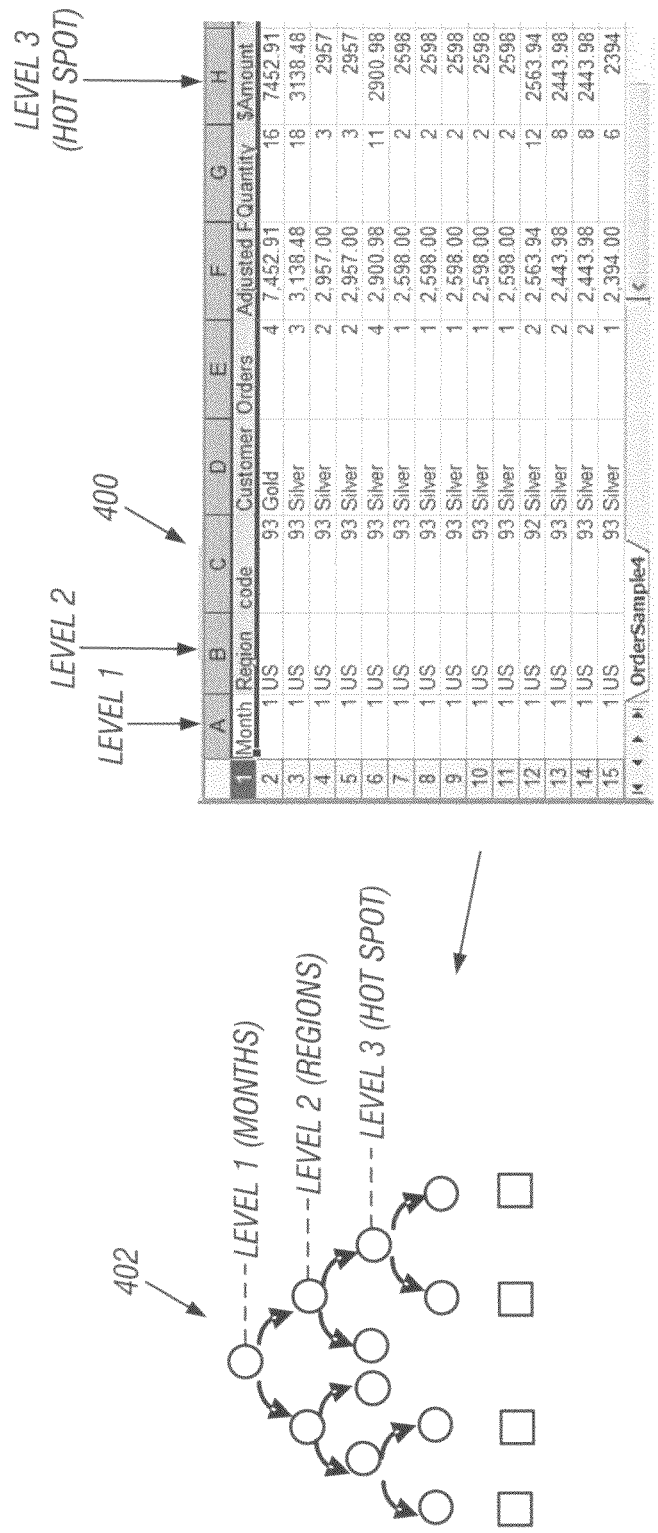
FIG. 4 shows an example relationship tree and associated input data set, according to an embodiment.

FIG. 4 shows an example portion of an input data set 400 that is in the form of a table. The table has various columns (column A, B, C, and so forth, depicted in FIG. 4) which correspond to different attributes of the input data set. The rows of the table represent records of the input data set 400. Column A contains the month attribute (which represents the months of the year), column B contains the region attribute (representing various regions of the world), and column H contains an amount attribute (which represents an amount of sales).

An example relationship tree that is derived from the input data 400 using techniques according to some embodiments is represented as 402 in FIG. 4, where the top-level node (representing the top-level graph) is at level 1, and is a graph for representing monthly sales amounts, for example. Level two of the relationship tree 402 can represent graphs representing different regions (e.g., North America, Europe, Asia Pacific, etc.). Level 3 of the relationship tree 402 represents graphs that depict hot spots (in this case, the three-sigma areas at the top of each bar of a pixel bar chart). Additional levels can be provided in the example relationship tree 402.

Figure 5:
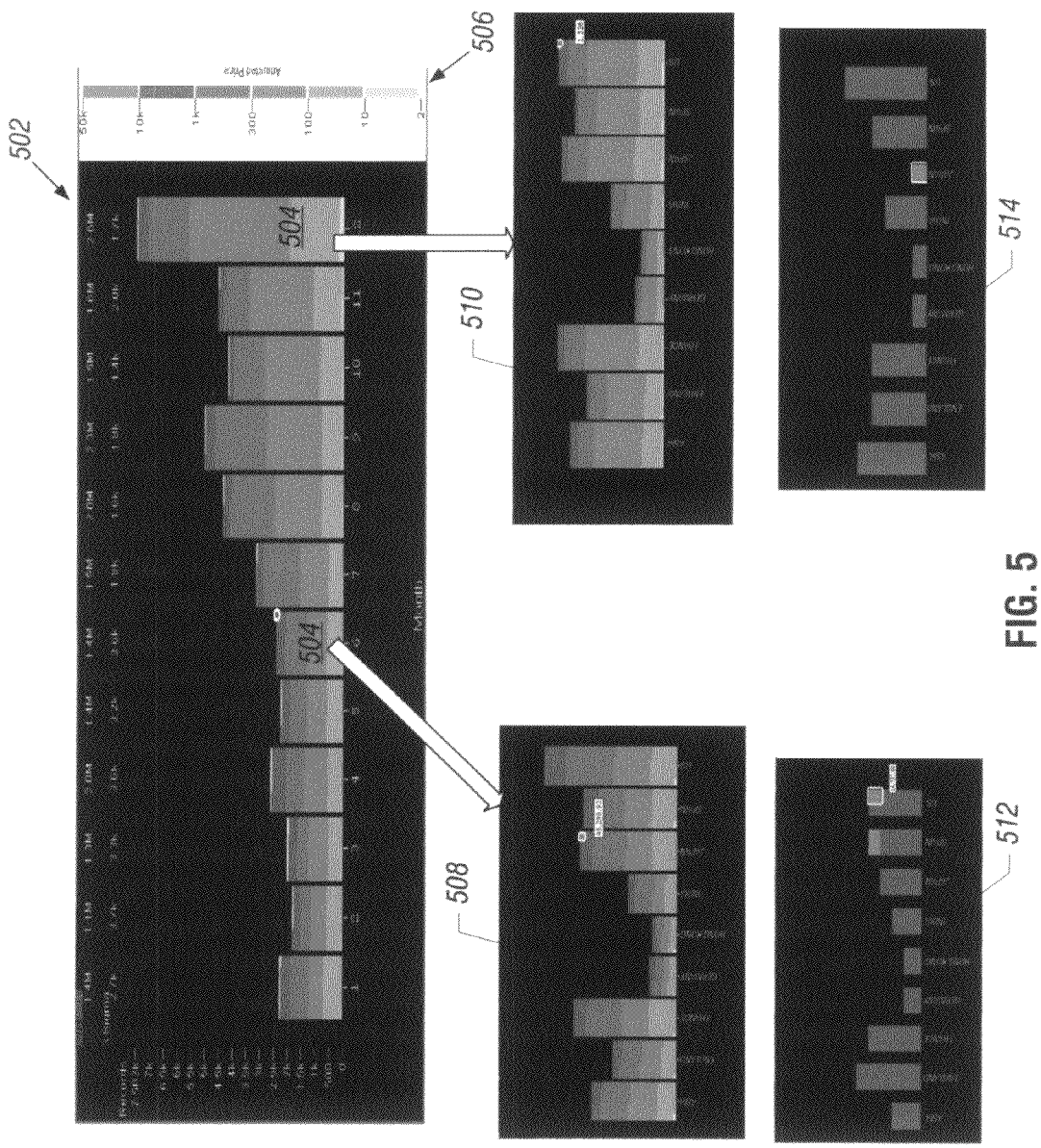
FIG. 5 illustrates various graphs that are accessible based on the relationship tree of FIG. 4, according to an embodiment.

FIG. 5 shows an example top-level graph 502 that corresponds to the top-level node of the relationship tree 402 of FIG. 4. The graph 502 of FIG. 5 is a pixel bar chart that has multiple bars 504 corresponding to different months of the year. Thus, 12 bars are depicted in the pixel bar chart 502 for twelve corresponding months. Within each bar 504, an array of pixels is provided, where the pixels represent data values for the sales amount attribute in column H of the input data set 400. The pixels are assigned different colors depending on the sales amount attribute values, where a mapping between colors and data values of the amount attribute is depicted in a color scale 506 in FIG. 5. The pixels within each bar 504 are sorted such that the lowest value is provided in the left, lower corner of the bar, whereas the highest value is provided in the right, upper corner of the bar. Thus, the pixels are sorted from left to right and from bottom to top by the data value of the attribute being visualized.

Instead of using colors for different values of the sales amount attribute, other types of visual indicators for different values can be used instead.

Level 2 graphs include a child graph 508 and another child graph 510, where the graph 508 is a drill-down graph based on user selection in the month 6 bar 504 of the top-level graph 502. Selection (such as by clicking a mouse or by a rubberband operation within the bar 504 corresponding to the month 6 bar of graph 502) causes the child graph 508 to be invoked, where the child graph 508 provides a month 6 region sales analysis (sales amounts for different regions). The child graph 508 is a pixel bar chart having multiple bars corresponding to different regions, where each bar contains pixels representing amount sales amount data values in month 6.

The child graph 510 is the month 12 region sales analysis, where the graph 510 is invoked in response to user selection of the bar 504 in the graph 502 corresponding to month 12.

Further drill down can be performed from the child graphs 508 and 510 by user selection at particular spots (e.g., hot spots) in the bars of the graphs 508 and 510. The hot spots can be three-sigma regions (regions of sales amounts that deviate from a mean by three standard deviations) of the pixel bar charts of graphs 508 and 512. In the example of FIG. 5, the further drill-down graphs include child graphs 512 and 514, where the graphs 512 and 514 are three-sigma regions sales analysis.

Figures 6, 7, 8:
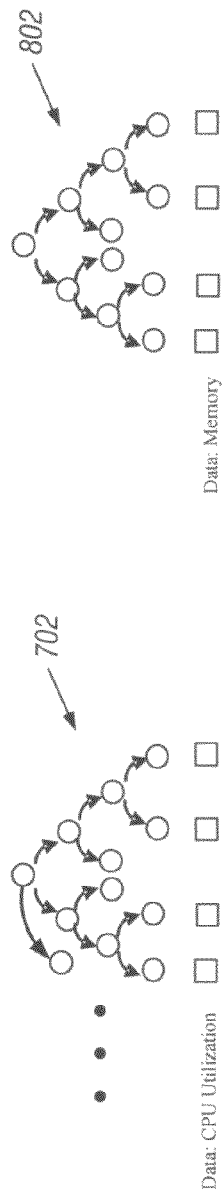
FIG. 6 illustrates another example input data set which can be visualized using techniques according to some embodiments.
FIGS. 7 and 8 illustrate two different relationship trees created according to some embodiments.

The above example is for an input data set that contains sales numbers for different months and for different regions. In a different example, as depicted in FIG. 6, performance attributes relating to execution of servers can be visualized. In FIG. 6, an input data set 600 includes various columns corresponding to different attributes relating to performance of servers. Column A contains a server name attribute that represents different names of servers. Column C contains a CPU utilization attribute that represents utilization of CPUs in the servers. Column E contains a memory attribute that indicates percentage utilization of the overall capacity of the memory in the respective server.

FIGS. 7 and 8 depict two different relationship trees 702 and 802, where the relationship tree 702 is associated with visualizing the CPU utilization attribute, whereas the relationship tree 802 is associated with visualizing the memory utilization attribute.

Figure 9:
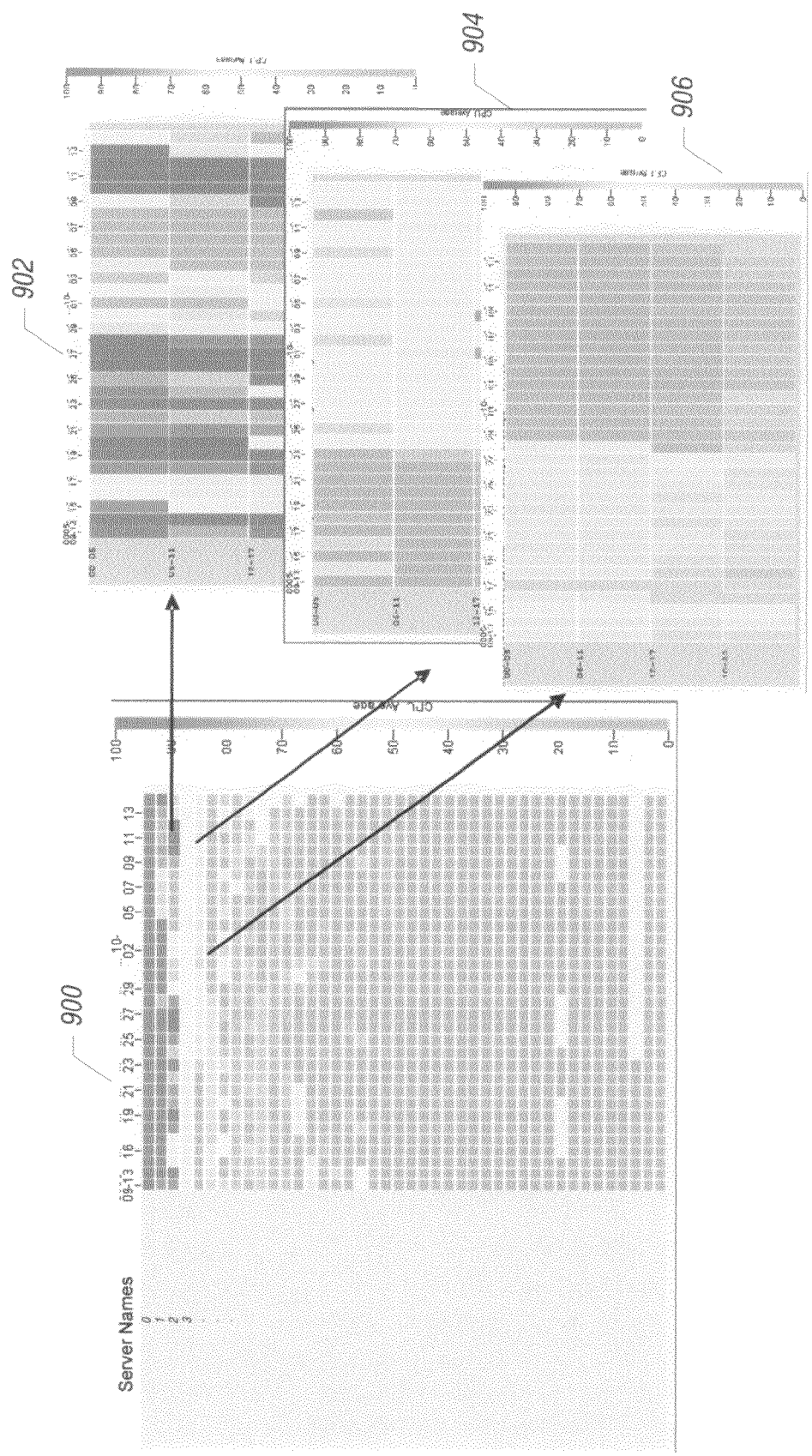
FIG. 9 illustrates a set of graphs that are accessible using the relationship tree of FIG. 7, according to an embodiment.

FIG. 9 shows a top-level graph 900, where the graph 900 is a line chart having multiple lines (rows) representing different server names. Each row of the line chart includes a series of cells that represent corresponding CPU utilization values according to time (in the example, days). Different CPU utilization values are mapped to different colors (or other visual indicators). Cells containing the red color indicate high CPU utilization, whereas cells assigned the green color have relatively low CPU utilization.

A user can select the cells to drill-down further, which can cause additional line charts 902, 904, and 906 to be displayed. The set, of graphs depicted in FIG. 9 correspond to the relationship tree 702 in FIG. 7. A different set of graphs can be displayed for the relationship tree 802 of FIG. 8.

Instructions of software described above (including the visualization program 106, monitoring module 120, relationship tree builder 122, web browser 136, and so forth of FIG. 1) are loaded for execution on a processor (such as one or more CPUs 108, 138 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer, comprising:
monitoring, by the computer, actions associated with visualizing an input data set using plural graphs, wherein at least one of the graphs is produced based on selection in another of the graphs;
based on monitoring the actions, creating, by the computer, a relationship tree that represents relationships of the graphs, wherein monitoring the actions comprises monitoring an execution order of a visualization program executed in the computer, the visualization program configured to access the input data set and provide a user interface to allow visualization of different aspects of the input data set, wherein the execution order of the visualization program is according to a sequence of user selections in the plural graphs, and wherein the relationship tree represents the execution order of the visualization program; and providing, by the computer, output information including description data and image data, wherein the description data contains at least a portion of the relationship tree, and wherein the output information enables interactive dynamic navigation through the plural graphs based on the at least a portion of the relationship tree without accessing the input data set and without invoking the visualization program.

2. The method of claim 1, wherein providing the output information comprises providing the output information that enables display of the plural graphs with a web browser instead of the visualization program.

3. The method of claim 1, wherein providing the output information comprises providing the description data that contains information pertaining to a top-level graph and at least one child graph of the plural graphs.

4. The method of claim 3, wherein providing the description data comprises providing a hypertext markup language (HTML) page.

5. The method of claim 3, wherein providing the description data that contains information pertaining to the top-level graph and the at least one child graph comprises providing the description data that contains link information from the top-level graph to the at least one child graph, the link information representing the execution order of the visualization program according to a sequence of user selections of the top-level graph and the at least one child graph.

6. The method of claim 3, wherein providing the output information comprises providing additional description data containing information pertaining to other graphs of the plural graphs.

7. The method of claim 3, wherein providing the output information further comprises providing image data of the top-level graph and providing image data of the at least one child graph.

8. The method of claim 1, further comprising:
monitoring further actions associated with visualizing the input data set using a second set of graphs;
creating a second relationship tree that represents a relationship of the second set of graphs; and
providing second output information containing at least a portion of the second relationship tree, wherein the second output information enables navigation through the second set of graphs without accessing the input data set and without invoking the visualization program.

9. The method of claim 1, further comprising embedding, in corresponding graphs, link information between nodes of the relationship tree, wherein the nodes represent corresponding ones of the plural graphs, and wherein the link information is created based on the sequence of user selections.

10. The method of claim 9, further comprising providing, in at least some of the graphs, visual indicators of links to other graphs.

11. The method of claim 9, further comprising:
embedding, in corresponding graphs, link information between nodes of a second relationship tree; and
providing visual indicators in at least some of the graphs of which links correspond to which of the relationship trees.

12. The method of claim 1, wherein the relationship tree includes nodes and links between the nodes, wherein the nodes represent corresponding ones of the plural graphs, the method further comprising defining the links based on the execution order of the visualization program used to visualize the input data set.

13. The method of claim 1, wherein providing the output information comprises providing plural markup documents and corresponding image files accessible using the markup documents, wherein the image files contain image data for the corresponding plural graphs.

14. A method executed by a computer, comprising:
receiving, by the computer, at least one document containing information that enables navigation through plural graphs that are used to visualize aspects of a data set, wherein the at least one document contains link information that is part of a relationship tree defining relationships among the plural graphs, wherein the link information represents an execution order of a visualization program used to visualize the plural graphs, wherein the execution order of the visualization program is according to a sequence of user selections in the plural graphs previously displayed by the visualization program;
displaying, by the computer without using the visualization program, a first of the graphs based on the at least one document, the first graph presenting a first visualization of the data set;
receiving, by the computer, selection of a part of the first graph; and
in response to the received selection, displaying, by the computer without using the visualization program, a second of the graphs to present a second visualization of the data set,
wherein displaying the first and second graphs is performed without accessing the data set.

15. The method of claim 14, further comprising receiving an image file containing an image of the first graph, the image file accessible from the at least one document.

16. The method of claim 15, further comprising receiving a second document that contains information to enable presentation of the second graph.

17. A non-transitory computer-readable storage medium that when executed cause a computer to:
monitor actions associated with visualizing an input data set using plural graphs, wherein at least one of the graphs is produced based on selection in another of the graphs;
based on monitoring the actions, create a relationship tree that represents relationships of the graphs, wherein monitoring the actions comprises monitoring an execution order of a visualization program executed in the computer, the visualization program configured to access the input data set and provide a user interface to allow visualization of different aspects of the input data set, wherein the execution order of the visualization program is according to a sequence of user selections in the plural graphs, and wherein the relationship tree represents the execution order of the visualization program; and
provide output information including description data and image data, wherein the description data contains at least a portion of the relationship tree, and wherein the output information enables interactive dynamic navigation through the plural graphs based on the at least a portion of the relationship tree without accessing the input data set and without invoking the visualization program.

18. The non-transitory computer-readable storage medium of claim 17, wherein providing the output information comprises providing the output information that enables display of the plural graphs with a web browser instead of the visualization program.

19. The non-transitory computer-readable storage medium of claim 17, wherein the image data represents the plural graphs.

\* \* \* \* \*